Sept. 11, 1962 L. BALAMUTH ET AL 3,053,124
ULTRASONIC WELDING
Filed Nov. 16, 1959
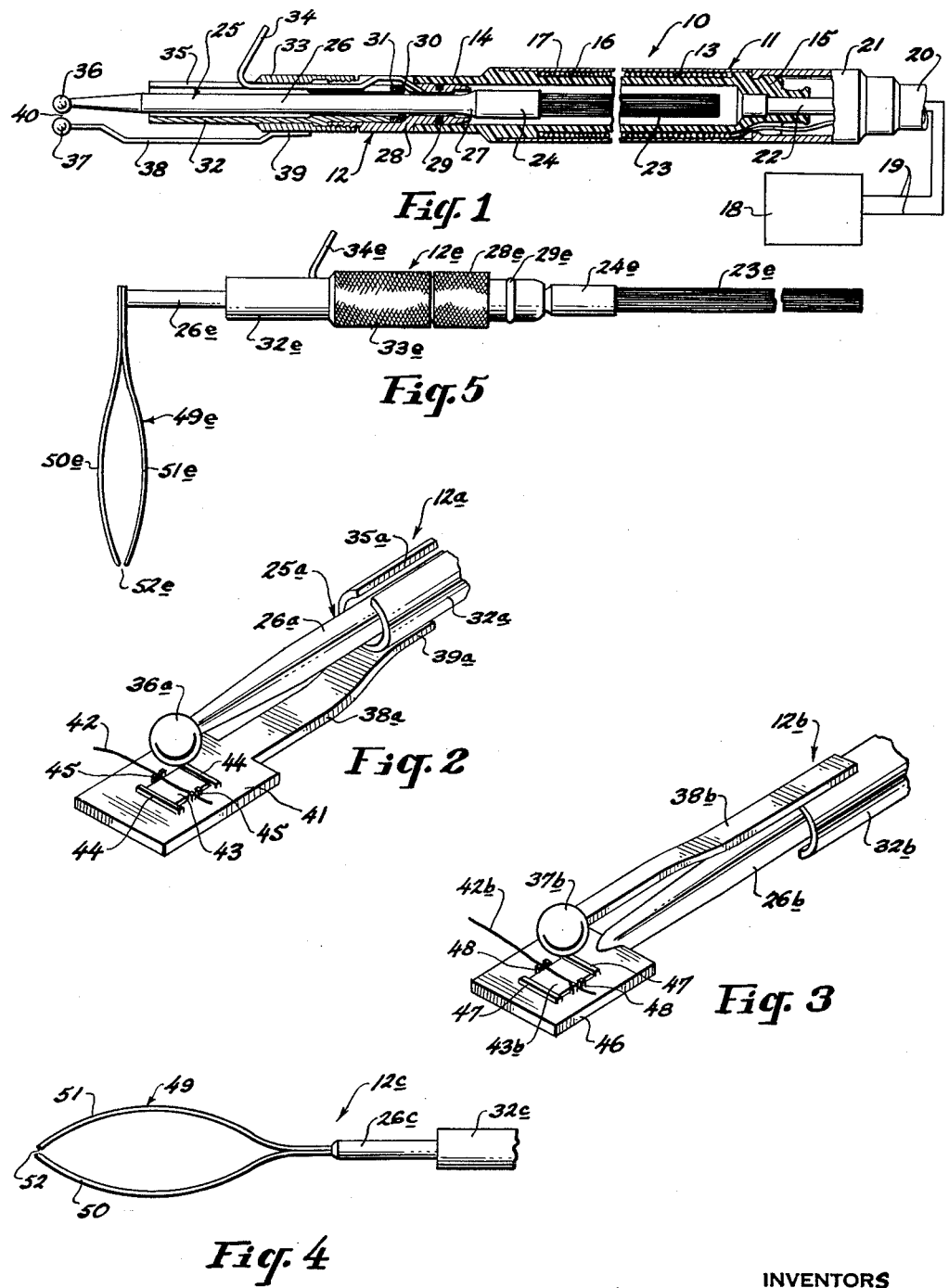
INVENTORS
LEWIS BALAMUTH, ARTHUR KURIS
AND CLAUS KLEESATTEL
BY
ATTORNEY

United States Patent Office 3,053,124
Patented Sept. 11, 1962

3,053,124
ULTRASONIC WELDING
Lewis Balamuth, Woodside, Arthur Kuris, Riverdale, and Claus Kleesattel, Forest Hills, N.Y., assignors to Cavitron Ultrasonics Inc., Long Island City, N.Y., a corporation of New York
Filed Nov. 16, 1959, Ser. No. 853,171
5 Claims. (Cl. 78—82)

This invention relates generally to ultrasonic welding, and more particularly is directed to the provision of improved tools for effecting the ultrasonic welding of extremely small, or even microscopic elements.

Ultrasonic welding of metals generally is known and is essentially a solid state bonding process carried out at ambient temperature, without the aid of solders or fluxes. In existing ultrasonic welding devices, the metals to be joined are placed between two welding tips or sonotrodes, representing a driving sonotrode and a reflecting sonotrode or acoustically dead base, respectively, and are clamped under a static pressure while ultrasonic energy is introduced through the driving sonotrode for a relatively short interval. This arrangement introduces elastic vibratory energy into the joint area with the result that a weld or bond is there formed between the metals. However, the existing ultrasonic welding devices are not adapted for the welding of extremely minute or even microscopic elements, since such existing devices are not designed to overcome those problems peculiar to the application of ultrasonic welding to the general field of the fabrication of extremely minute elements. By way of illustrating the general field to which ultrasonic welding is to be applied in accordance with the present invention, it may be mentioned that single pieces of semi-conductor material measuring less than ¼ inch by ⅛ inch by 1/32 inch have been formed into complete electronic circuits containing the equivalent of twelve separate components, namely, two transistors, two capacitors, and eight resistors. In manufacturing such minute, and yet complete electronic circuits, it is necessary to attach very fine wire leads, frequently having diameters of less than .002 inch and being barely visible to the naked eye, to extremely small metal terminals or spots fired on the surface of the semiconductor wafer.

The existing ultrasonic welding devices do not permit the accurate relative positioning of the metal elements which are to be welded when applied to welding of extremely minute elements of the kind illustrated above, and further do not serve to introduce sufficient elastic vibratory energy into the joint area without causing such relatively large scale displacement of the elements to be welded as to prevent the achievement of a satisfactory weld.

Accordingly, it is an object of the present invention to provide ultrasonic welding devices particularly suited for the welding of extremely minute, or even microscopic elements.

Another object is to provide ultrasonic welding devices having the above mentioned capabilities, and which are particularly adapted to be hand operated, or to be embodied in automated machinery.

A further object is to provide tools which are particularly adapted for the ultrasonic welding of extremely minute elements, and which are interchangeable with other work tools in acoustically vibrated material treating devices of the type disclosed in the co-pending application for United States Letters Patent, Serial No. 758,069, filed August 29, 1958, by Lewis Balamuth, Arthur Kuris and Claus Kleesattel, and wherein each work tool is rigidly joined, in end to end relationship, to a connecting body or acoustic impedance transformer and to a transducer to form an insert unit or assembly which is removably supported in a housing containing a coil in surrounding relationship to the transducer and receiving a biased alternating current for producing an alternating electromagnetic field.

In accordance with an aspect of the present invention, extremely minute elements may be ultrasonically welded between two welding tips having a small area of contact, with at least one of the welding tips being resiliently supported so that the welding tips can be moved relatively toward each other, in a way similar to the prongs of a pair of tweezers, for suitably gripping the minute elements to be welded, while ultrasonic energy is introduced through the support of at least one of the welding tips at a suitable frequency and amplitude to cause welding together of the lightly held elements.

In accordance with another aspect of the invention, both of the welding tips are formed as integral parts of an insert unit or assembly which further includes a transducer, a connecting body or transformer and means to removably support the unit in a housing containing an excitation coil for establishing the alternating electromagnetic field by which the transducer is induced to vibrate at a relatively high frequency and small amplitude. Thus, each insert unit having welding tips as an integral part thereof is conveniently interchangeable with other insert units having either different types of welding tips or other work tools.

A further feature of the invention resides in the provision of an insert unit having welding tips as an integral part thereof for effecting ultrasonic welding of extremely minute elements, and wherein one of such welding tips has jig means or the like thereon for accurately locating such minute elements with respect to each other and with respect to the welding tips.

The above, and other objects, features and advantages of the invention, will be apparent in the following detailed description of illustrative embodiments thereof which is to be read in connection with the accompanying drawing forming a part hereof, and wherein:

FIG. 1 is a side elevational view, partly broken away and in axial section, of an ultrasonic welding device embodying the present invention;

FIG. 2 is an enlarged fragmentary perspective view of a portion of an insert unit of the kind included in the device of FIG. 1, but having a different arrangement of welding tips as an integral part thereof;

FIG. 3 is a view similar to that of FIG. 2, but showing another arrangement of the welding tips;

FIG. 4 is a fragmentary elevational view of a removable insert unit similar to that included in the device of FIG. 1, but having welding tips in accordance with another embodiment of the invention; and FIG. 5 is a side elevational view of a removable insert unit similar to that included in the device of FIG. 1, but having an arrangement of welding tips in accordance with yet another embodiment of the invention.

Referring to the drawing in detail, and initially to FIG. 1 thereof, it will be seen that an ultrasonic welding device embodying the present invention, and there generally identified by the reference numeral 10, may be in the form of a hand piece which generally comprises a tubular housing 11 into which a welding tip supporting insert unit 12 may be partially telescoped.

The housing 11, as in our above identified, prior filed application, serial No. 758,069, includes a tubular casing 13 preferably formed of molded plastic, such as, nylon or the like, and having an inner wall surface which is relatively smooth and of uniform diameter throughout. The casing 13 has an extension 14, at one end, through which insert unit 12 can extend into the casing, while the other, or tail end of casing 13 terminates in a nipple portion 15. A winding 16 of current conducting wire, such as, copper or the like, which is protected by an enamel coating is wound on the outside of tubular casing 13 and is enclosed and protected by an outer jacket 17 which may be formed of extruded plastic tubing. The plastic material of casing 13 does not impede the establishment of an alternating electromagnetic field within the tubular casing upon excitation of the exterior winding or coil 16. The biased alternating current for exciting winding 16 is supplied to the latter from a suitable generator 18 by way of wire leads 19 which are housed in a protective flexible conduit 20 connected to the nipple portion 15 of casing 13 by an adaptor 21. Conduit 20 also contains a tube 22 by which a coolant may be supplied through nipple portion 15 to the interior of tubular casing 13.

The insert unit 12 is made up of a mechanical vibrator that includes a transducer 23 designed to be telescoped within tubular casing 13 with winding 16 in surrounding relation thereto. The transducer 23 may be any one of a number of electromechanical types, such as, electrodynamic, piezo-electric or magnetostrictive, however, for the operating range of frequencies most desirable for ultrasonic welding of minute elements, transducer 23 is preferably of the magnetostrictive type. The magnetostrictive transducer 23 is preferably formed of a metal, such as, permanickel, nickel, permendur, or other metals which have high tensile strength and are highly magnetostrictive in character, so that it will vibrate to a maximum degree when subjected to the influence of the alternating electromagnetic field established by the biased alternating current supplied to winding 16.

In the embodiment shown in FIG. 1, transducer 23 comprises a stack of strips of the selected metal secured together at one end, while the other end of the transducer is rigidly fixed, as by brazing solder, to a head 24 of an acoustic impedance transformer generally identified by the reference numeral 25 and also forming part of the mechanical vibrator.

In place of the stack of metal strips forming the transducer 23 in the illustrated embodiment of the invention, there may be substituted a bundle of metal wires or rods, preferably of rectangular cross-section so that they can be compactly assembled together, a roll of metal foil, or a longitudinally split hollow metal tube. In any case, the length of the magnetostrictive transducer 23 is selected so that it will be a half wave length, or multiples thereof, at the frequency of the alternating electromagnetic field established within tubular casing 13 by winding 16.

The acoustic impedance transformer or connecting body 25 may be made of a strong metal, such as, steel, Monel metal, titanium, Phosphor-bronze, brass or beryllium copper, and further includes a stem 26 integrally joined to the head 24 by a tapered neck 27. The length of stem 26 is sufficient so that it will project out of housing 11 when insert unit 12 is assembled to housing 11 with transducer 23 telescoped within casing 13.

In the embodiment of the invention illustrated in FIG. 1, the removable insert unit 12 further includes a tubular retainer 28 extending loosely around stem 26 and having a reduced diameter neck dimensioned to telescope snugly into extension 14 of casing 13, and to abut, at its edge, against tapered neck 27. A resilient O-ring 29 is set within a groove extending around the reduced neck of retainer 28, and provides a liquid seal between the neck and extension 14.

A second resilient O-ring 30 fits snugly around stem 26 of transformer 25 and is driven axially into abutment against an internal shoulder of tubular retainer 28 by a metal ring 31 which fits loosely over the transformer stem 26. The portion of stem 26 extending beyond retainer 28 may be protected by a guard member 32 having a throat telescoping snugly into retainer 28 and thus supported by the latter. The protective guard member 32 is held in assembled relation to retainer 28 by means of a sleeve 33 engaging an external shoulder 34 on guard member 32 and having a threaded connection with retainer 28 so that, when sleeve 33 is tightened on retainer 28, guard member 32 is drawn axially into retainer 28 and acts, at its inner edge, against metal ring 31 which is, in turn, pressed against resilient O-ring 30 to radially expand the latter. The expanded O-ring 30 provides a fluid seal between stem 26 and the bore of retainer 28, and additionally provides the sole support for the mechanical vibrator formed by transformer 25 and transducer 23 at approximately a node of movement thereof so that the vibrations of high frequency and low amplitude are not dampened or transmitted to the housing.

It will be apparent that the entire insert unit 12 may be disconnected from housing 11 by merely exerting an outward pull thereon sufficient to withdraw the reduced neck and associated O-ring 29 of retainer 28 from extension 14 of casing 13. The entire insert unit 12 may likewise be attached to the housing 11 in a leak-proof manner merely by telescoping the reduced neck and O-ring 29 of retainer 28 into extension 14. Thus, interchangeable insert units constructed in the above described manner and equipped with welding tips of different kinds and shapes, as hereinafter described in detail, can be quickly applied and removed from the housing 11 as desired.

Since the transducer 23 is subjected to heating after prolonged operation and most effectively serves its purpose when maintained in relatively cool condition, the flow of cooling fluid, such as, water or cold air, from tube 22 is directed into the interior of casing 13 containing the transducer, and such flow of cooling fluid also maintains the outer jacket 13 at approximately room temperature so that it can be comfortably grasped. The cooling fluid supplied to the interior of casing 13 is permitted to bleed into the bore of retainer 28 through one or more notches (not shown) in the edge of the reduced diameter neck of the retainer, and is discharged from the bore of retainer 28 through a bent tube 34 which bypasses rings 30 and 31 and then extends outwardly through a longitudinal slot 35 in guard member 32. The discharge tube 34 may be connected to flexible tubing (not shown) for carrying the discharged cooling fluid away from the welding area.

In accordance with the present invention, the insert unit 12 further includes a tweezer-like arrangement of welding tips adapted to hold the elements to be welded therebetween, while at least one of the welding tips is connected to the output end of the acoustic impedance transformer to be vibrated by the latter.

In the embodiment of the invention illustrated in FIG. 1, welding tips 36 and 37 are respectively securely attached, as by brazing solder, to the outer end of transformer stem 26, and to one end of a resilient, generally bowed metal strip 38 having its opposite end securely attached, as by brazing solder, to the sleeve 33, as at 39. The strip 38 has a length sufficient to dispose the related welding tip 37 adjacent the welding tip 36 with a small space or clearance 40 being normally present therebetween. In FIG. 1, both welding tips 36 and 37 are in the form of small spheres having a small area of contact therebetween when strip 38 supporting tip 37 is manually or otherwise flexed towards transformer stem 26.

Since welding tip 36 forms an extension of transformer 25, that welding tip should be taken into consideration in determining the length of the transformer which has to correspond to one-half wave length, or multiples thereof, at the vibration frequency of transducer 23. The tip 36 is preferably disposed at a longitudinal loop of motion while a node of motion of transformer 25 is in the area adjacent to resilient ring 30 by which the integral assembly of transducer 23, transformer 25 and welding tip 36 is exclusively supported. With welding tip 36 being symmetrical about the axis of transformer 25, as is the case with a spherical welding tip, and being disposed at a longitudinal loop of motion, a vibrational stroke is established at the welding tip 36 in a direction substantially in alignment with the axis of transformer 25.

When two metal elements to be welded to each other, for example, a fine wire lead to be attached to a small minimum spot fired on a transistor blank surface, are placed in the space 40 between welding tips 36 and 37 and held in contact with each other by a light pressure resulting from flexing of strip 38 toward transformer 25, the vibrational stroke of welding tip 36 in contact with one of the elements to be welded introduces elastic vibratory energy into the joint at the area of contact and, when the introduced energy is sufficiently high, a strong welded joint is formed. However, it has been found that, particularly in welding extremely minute elements, certain limitations must be observed with respect to the amplitude and frequency of the vibratory energy. Specifically, the vibratory stroke must be less than the minimum dimension of the smaller of the two elements being welded to each other, and is preferably one-tenth or less than such minimum dimension. Having in mind the foregoing limitation with respect to the vibratory stroke, it is apparent that the operating frequency must be suitably selected so as to obtain the introduction of sufficient elastic vibratory energy for establishing welding conditions at the joint area. It has been found that, if the minimum dimension of the elements to be welded is larger than .002 inch, an operating frequency range in the order of 20,000 to about 30,000 cycles per second will be sufficient to effect the necessary weld. However, if the minimum dimension is less than .002 inch, an operating frequency range between 60,000 and about 80,000 cycles per second is preferred.

The amplitude of the vibratory movement imparted to welding tip 36 may be held to the desired limits by suitably designing and proportioning acoustic impedance transformer 25. Thus, transformer 25 can be designed to magnify the amplitude of the vibrations delivered thereto by transducer 23 or to decrease the amplitude of the vibration of welding tip 36 to a value lower than the amplitude at the end of transformer 25 attached to transducer 23. When the tranformer has a larger cross-sectional area at the end to which the transducer is attached than at the end to which the welding tip is attached, as in FIG. 1, the amplitude of the vibrations delivered to welding tip 36 is correspondingly amplified or increased, and, conversely, when the transducer attached end of transformer 25 has a smaller cross-sectional area than the opposite end thereof, the amplitude of vibration of welding tip 36 has a correspondingly smaller value than the amplitude of vibrations received from transducer 23. Thus, by a proper proportioning of the cross-sectional areas of the vibration receiving end and vibration delivering end of transformer 25, the attached welding tip 36 may be given a wide range of vibratory strokes at the frequency of vibration of transducer 23.

With welding tip 36 disposed approximately at a longitudinal loop of motion of transformer stem 26, and with welding tip 37 supported by strip 38 from sleeve 33 which is isolated from the vibratory movement of transformer 25, it will be apparent that relative movement will occur between the welding tips and the elements to be welded which are lightly held therebetween, and also between the elements to be welded, and such relative movement will be accompanied by frictional heating serving to produce the desired welding action. In order to avoid welding of the tips 36 and 37 to the elements to be welded, it is necessary that the welding tips be made of a metal having a higher melting point than the melting point of the metals forming the elements to be welded. Further, it is preferable that the welding tips be of a metal which is non-wettable by the metals of the elements to be welded, thereby to avoid ahesion of the latter to the welding tips upon cooling of the melted weld metal.

Although the welding tip arrangement illustrated in the embodiment of FIG. 1 is made up of two identical spheres 36 and 37, many variations or modifications of this arrangement are possible within the scope of the present invention. Thus, as illustrated in FIG. 2, wherein parts corresponding to those described above with reference to FIG. 1 are identified by the same reference numerals, but with the letter "a" appended thereto, the welding tip 36a carried by the acoustic impedance transformer 25a is still in the form of a small-diameter sphere, but the welding tip carried by the resilient strip 38a is in the form of a flat plate 41 disposed adjacent welding tip 36a and conveniently providing a base for supporting the elements to be welded, which are merely illustrated as a fine wire 42 and a small metal or foil plate 43. With the arrangement illustrated in FIG. 2, the welding tip 41, in the form of a flat plate, can conveniently constitute a jig for locating the elements 42 and 43 with respect to each other and also with respect to the vibrated welding tip 36a so that the small area of contact of the latter with element 42 will be at the point where a weld is desired between elements 42 and 43. Thus, as shown in FIG. 2 merely by way of example, welding tip 41 may have abutments 44 and 45 projecting from the flat surface thereof facing toward welding tip 36a to locate plate element 43 between such abutments, while abutments 45 are slotted to receive the fine wire element 42, which is thereby located with respect to the plate element 43.

FIG. 2 further illustrates that the resilient strip 38a carrying one of the welding tips may extend from the protective guard member 32a rather than from the sleeve 33, as in FIG. 1.

As shown in FIG. 3, wherein the parts corresponding to those described with reference to FIG. 1 are identified by the same reference numerals, but with the letter "b" appended thereto, the arrangement of the welding tips described with reference to FIG. 2 may be reversed. Thus, in the embodiment of FIG. 3, the welding tip 37b carried by the resilient strip 38b secured to guard member 32b is in the form of a small sphere, while stem 26b of the acoustic impedance transformer carries a welding tip 46 in the form of a flat plate which is similar to the welding tip 41 of FIG. 2, and which may similarly carry abutments 47 and 48 representing a jig for securing the desired positional relationship between the elements 42b and 43b which are to be welded.

Although each of the above described embodiments of the invention has a tweezer-like arrangement of the welding tips forming part of the removable insert unit, with one welding tip being vibrated while the other welding tip is relatively stationary, it is to be noted that tweezer-like arrangements of welding tips may have both of the tips vibrated simultaneously in accordance with the present invention. Thus, in the embodiment of FIG. 4, wherein parts corresponding to those previously described with reference to FIG. 1 are identified by the same reference numeral, but with the letter "c" appended thereto, to stem 26c of the acoustic impedance transformer has a pair of tweezers 49 secured to its free end, for example, by brazing solder, with such tweezers 49 being formed of resilient prongs 50 and 51 arranged symmetrically with respect to the longitudinal axis of the transformer and having ends engageable with a small area of contact to constitute the welding tips. A gap or space 52 is normally present between the welding tip constituting ends of prongs 50 and 51 to receive the elements to be welded, and the latter are held by the welding tips of the prongs when the latter are pressed, either manually or otherwise, toward each other. When prongs 50 and 51 are simultaneously vibrated by way of the acoustic impedance transformer, the accelerations involved in such vibratory movement are so high that there is a tendency of the elements to be welded, which are held by only a light pressure, to lag behind the movements of the welding tips, whereby there is frictional heating of the elements to be welded sufficient to provide the necessary welding conditions. The prongs 50 and 51 of the tweezers 49 in FIG. 4, being formed of flat spring steel, or the like, are obviously manipulable by finger-exerted pressure.

In FIG. 4, the tweezer or pincer-like prongs which define the welding tips at their free ends and which are simultaneously vibrated by the acoustic impedance transformer, are symmetrically disposed with respect to the longitudinal axis of the transformer, but, as shown in FIG. 5, such symmetrical arrangement of the welding tips is not necessary in accordance with the present invention. In FIG. 5, wherein the parts corresponding to those previously described with reference to FIG. 1 are identified by the same reference numerals, but with the letter "e" appended thereto, the stem 26e of the acoustic impedance transformer has tweezers 49e secured to its free end, as by brazing solder, with such tweezers corresponding to the tweezers 49 of FIG. 4, but having the axis of symmetry of its resilient arms 50e and 51e arranged at right angles to the longitudinal axis of the transformer. It has been found that, with the arrangement of FIG. 5, vibratory movement is imparted to the free ends of prongs 50e and 51e defining the welding tips at opposite sides of a gap 52e adapted to receive the elements to be welded, and that such vibratory movement produces the necessary frictional heating for welding together the elements which are lightly held by flexing together of the prongs 50e and 51e.

It will be apparent that, in each of the above described specific embodiments of the invention, the welding tips are parts of tweezer or pincer-like assemblies embodied in a removable insert unit 12—12e intended for interchangeable use in association with the housing 11 of FIG. 1. Although the assembled device made up of the housing 11 and a removable insert unit is ideally suited for hand operation, it is apparent that the housing 11 may be held in a suitable fixed clamp, while a movable actuating member operated either mechanically, electrically or hydraulically, is disposed adjacent at least one of the flexible prongs of the tweezer-like arrangement, for example, adjacent the resilient strip 38 of FIG. 1, and is movable in order to provide the necessary light holding pressure upon the elements to be welded between the tips 36 and 37.

Although illustrative embodiments of the invention have been described in detail herein with reference to the accompanying drawing, it is to be understood that the invention is not limited to those precise embodiments, and that various changes and modifications may be effected therein by one skilled in the art without departing from the scope or spirit of the invention, except as defined in the appended claims.

What is claimed is:

1. An ultrasonic welding device comprising a casing, exciting means mounted on said casing and establishing an alternating electro-magnetic field in the casing, two arms extending from the casing in side-by-side relation and being secured to the casing, at least one of said arms being subjected to ultrasonic vibration by said electro-magnetic field, welding tips on said arms having a small area of contact, and at least one of said arms being resilient for holding the welding tips in contact with each other.

2. An ultrasonic welding device as in claim 1; wherein both of said welding tips are spherical.

3. An ultrasonic welding device as in claim 1; wherein one of said welding tips is spherical and the other of said tips is a substantially flat plate.

4. An ultrasonic welding device as in claim 3; wherein said flat plate has means thereon defining a jig for locating the elements to be welded relative to each other.

5. An ultrasonic welding device as in claim 1; wherein said arms are both resilient and both subjected to ultrasonic vibrations.

References Cited in the file of this patent

UNITED STATES PATENTS

| | | |
|---|---|---|
| 2,632,858 | Calosi | Mar. 24, 1953 |
| 2,704,333 | Calosi et al. | Mar. 15, 1955 |
| 2,707,825 | Sowter | May 10, 1955 |
| 2,707,826 | Sowter | May 10, 1955 |
| 2,803,735 | Jones | Aug. 20, 1957 |
| 2,874,470 | Richards | Feb. 24, 1959 |
| 2,939,348 | Barnes | June 7, 1960 |